(12) United States Patent
Chen et al.

(10) Patent No.: US 10,415,202 B2
(45) Date of Patent: Sep. 17, 2019

(54) METHOD FOR CONTROLLING THE GATE BASED ON THE HABITAT REQUIREMENT FOR FISH OVERWINTERING IN RIVES

(71) Applicant: Nanjing Hydraulic Research Institute, Nanjing (CN)

(72) Inventors: Qiuwen Chen, Nanjing (CN); Li Wang, Nanjing (CN); Yuqing Lin, Nanjing (CN); Liuming Hu, Nanjing (CN); Tiesheng Guan, Nanjing (CN); Cheng Chen, Nanjing (CN); Ranran Feng, Nanjing (CN)

(73) Assignee: Nanjing Hydraulic Research Institute, Nanjing (CN)

( * ) Notice: Subject to any disclaimer, the term of this patent is extended or adjusted under 35 U.S.C. 154(b) by 0 days.

(21) Appl. No.: 16/100,242

(22) Filed: Aug. 10, 2018

(65) Prior Publication Data
US 2018/0347133 A1    Dec. 6, 2018

(30) Foreign Application Priority Data

Aug. 14, 2017    (CN) .......................... 2017 1 0691543

(51) Int. Cl.
*A01K 61/10*    (2017.01)
*E02B 3/10*    (2006.01)
(Continued)

(52) U.S. Cl.
CPC ................ *E02B 7/40* (2013.01); *A01K 61/10* (2017.01); *A01K 61/70* (2017.01); *E02B 1/00* (2013.01);
(Continued)

(58) Field of Classification Search
CPC ... E02B 1/00; E02B 1/003; E02B 3/10; E02B 7/40; E02B 7/205; E02B 8/08; A01K 61/10; A01K 61/70; G01C 13/008; Y02A 20/402
See application file for complete search history.

(56) References Cited

U.S. PATENT DOCUMENTS 1,046,964 A * 12/1912 Burkholder ............. E02B 8/085
405/81
1,047,604 A * 12/1912 Abernathy .............. E02B 8/085
405/81
(Continued)

*Primary Examiner* — Benjamin F Fiorello
(74) *Attorney, Agent, or Firm* — CBM Patent Consulting, LLC

(57) ABSTRACT

A method for controlling the gate based on the habitat requirement for fish overwintering in rivers. According to the characteristics of biological habitat of the river and the habitat demand of fishes during overwintering, the method specifically comprises the steps of: firstly, determining candidate fishes for ecological flow calculation though fish resources investigating and historical data, and then screening out the target fish by adopting hierarchical analysis method; Secondly, establishing a quantitative response relationship curve between target fish physiological adaptions and water temperature, obtaining ecological water level which ensures the target fish overwintering safely according to the vertical temperature distribution, and establishing the relation between water depth and discharge using hydrodynamic model; finally, setting up a gate control system including a radar water level meter in the overwintering areas and an ecological water level management system in a gate control room.

4 Claims, 4 Drawing Sheets

(51) Int. Cl.
*E02B 7/20* (2006.01)
*E02B 7/40* (2006.01)
*A01K 61/70* (2017.01)
*E02B 1/00* (2006.01)
*G01C 13/00* (2006.01)
*E02B 8/08* (2006.01)

(52) U.S. Cl.
CPC ................ *E02B 3/10* (2013.01); *E02B 7/205* (2013.01); *G01C 13/008* (2013.01); *E02B 1/003* (2013.01); *E02B 8/08* (2013.01); *Y02A 20/402* (2018.01)

(56) References Cited

U.S. PATENT DOCUMENTS

| | | | | |
|---|---|---|---|---|
| 1,292,246 A * | 1/1919 | Burkey | ................ | A01K 79/02 119/220 |
| 1,376,889 A * | 5/1921 | Kirby | ................ | E02B 5/082 405/107 |
| 3,293,862 A * | 12/1966 | Harding | ................ | E02B 8/085 405/81 |
| 4,349,296 A * | 9/1982 | Langeman | ................ | E02B 13/00 405/94 |
| 4,498,809 A * | 2/1985 | Farmer | ................ | G05D 9/12 137/386 |
| 5,372,456 A * | 12/1994 | Langemann | ................ | E02B 7/44 137/392 |
| 6,427,718 B1 * | 8/2002 | Stringam | ................ | A01G 25/16 137/392 |
| 6,467,998 B1 * | 10/2002 | Timms | ................ | E02B 7/205 405/104 |
| 6,588,370 B1 * | 7/2003 | Odeh | ................ | E02B 8/085 119/219 |
| 8,608,404 B2 * | 12/2013 | Safreno | ................ | A01G 25/16 405/92 |
| 8,695,628 B2 * | 4/2014 | Komatsu | ................ | E03F 9/007 137/423 |
| 2004/0165955 A1 * | 8/2004 | Davis | ................ | E02B 8/085 405/81 |
| 2005/0129463 A1 * | 6/2005 | Craig | ................ | E02B 8/085 405/99 |
| 2007/0065231 A1 * | 3/2007 | McWha | ................ | E02B 7/005 405/81 |
| 2008/0213045 A1 * | 9/2008 | Tappel | ................ | E02B 8/085 405/81 |
| 2011/0280662 A1 * | 11/2011 | Millard | ................ | F15B 21/14 405/81 |
| 2016/0017558 A1 * | 1/2016 | French, Sr. | ................ | E02B 8/085 405/81 |

\* cited by examiner

METHOD FOR CONTROLLING THE GATE BASED ON THE HABITAT REQUIREMENT FOR FISH OVERWINTERING IN RIVES

This application claims priority to Chinese Patent Application Ser. No. CN201710691543.6 filed on 14 Aug. 2017.

TECHNICAL FIELD

The invention relates to the field of hydrotechnics, in particular to a method for controlling the gate based on the habitat requirement for fish overwintering in rivers.

BACKGROUND ART

Fish are ectotherms and hence their ability to interact with their environment, and acquire energy for growth and reproduction, strongly depends on temperature. In boreal areas, winter conditions prevail for a substantial portion of the year. As water temperature decreases, fishes become less active and move to deeper water. Because the temperature in deep water is approximately equal to mean annual air temperature and maintains in a range that is acceptable for fish surviving even when air temperatures drop below freezing point. Hence, the appropriate water depth should maintain in overwintering areas to make sure fish survival. However, humans have built a large number of hydraulic engineering on rivers to meet the needs of social and economic development, which result in runoff decrease in the downstream, especially in winter. The water depth in the fish overwintering areas was too shallow to overwinter. In recognition of these issue, this invention provides a novel method to control the gate based on the habitat requirement to make sure that fish could live through winters safely.

SUMMARY OF THE INVENTION

Object of the invention: in order to protect fish resources and make sure that fish could live through winters safely, the invention provides a novel method to control the gate based on the habitat requirement for fish overwintering in rivers.

Technical scheme: the method for controlling the gate based on the habitat requirement for fish overwintering in rivers comprises:

(1) Collecting fish resources and fish overwintering areas in a river, and then screening out a target species of fish by a hierarchical analysis;
(2) Establishing a quantitative response relationship curve $f_1(T)$ between the physiological adaptions of the target species and water temperature T through indoor experiments and historical data collection;
(3) Establishing a formula of variation $f_2(H)$ between vertical water temperature T and water level H in the river;
(4) Determining a minimum water temperature $T_{min}$ required for the target species to overwinter according to the quantitative response relationship curve $f_1(T)$, then obtaining an ecological water level $H_{eco}$ which can ensure the target species for overwintering safely based on $T_{min}$ according to the formula $f_2(H)$
(5) Establishing the relation $f_3(Q)$ between water depth H and discharge Q using a hydrodynamic model;
(6) Setting up a gate control system including a radar water level meter in the overwintering areas and an ecological water level management system in a gate control room;
(7) Controlling the gate based on the $H_{eco}$ in the overwintering areas.

Further, the step (1) specifically comprises:

(1-1) the fish resources including a number of fish populations, structural and ecological status of the fish populations, status of fishery utilization, and change pattern of the fish populations and the number so as to judge the status of the resources and the changing trend thereof; candidate fishes for calculating the ecological flow of the river are determined based on the current and historical data of the fish resources in the river;

(1-2) a screening principle is formulated according to the biological characteristics of fish, a judgment matrix is constructed using an hierarchical analysis method for the candidate fishes, the sorting weights of various candidate species are calculated, and the target species with representative habitat demand in the river is screened out.

Further, the formula of variation $f_2(H)$ between the temperature T and the water level H in the step (3) is specifically as follows:

$$\begin{cases} T_H = f_2(H) = (T_0 - T_b)e^{(-H/x)^n} + T_b \\ n = \dfrac{15}{m^2} + \dfrac{m^2}{35} \\ x = \dfrac{40}{m} + \dfrac{m^2}{2.37(1+0.1m)} \end{cases}$$

Wherein m is month, $T_b$ is the monthly average bottom water temperature, in □; $T_0$ is the monthly average surface water temperature, in □; $T_H$ is the monthly average water temperature at the depth H, in □.

Further, establishing the relation $f_3(Q)$ between water depth H and discharge Q using hydrodynamic model in the step (5) is specifically as follows:

The hydrodynamic model computed the depth-averaged flow velocity and the water-surface elevation by solving the shallow-water equations, with hydrostatic and Boussinesq approximations; in a Cartesian coordinates, the equations are:

$$\nabla \cdot u + \frac{\partial w}{\partial z} = 0$$

$$\frac{\partial \eta}{\partial t} + \nabla \cdot \int_{-h}^{\eta} u \, dz = 0$$

$$\frac{Du}{Dt} = f - g\nabla \eta + \frac{\partial}{\partial z}\left(v \frac{\partial u}{\partial z}\right);$$

$$f = -fk \times u + \alpha_g \nabla \hat{\psi} - \frac{1}{\rho_0}\nabla p_A - \frac{g}{\rho_0}\int_z^{\eta}\nabla \rho d\zeta + \nabla \cdot (\mu \nabla u)$$

Where z is the vertical coordinate, positive upward, in m; $\nabla$ presents $$\left(\frac{\partial}{\partial x}, \frac{\partial}{\partial y}\right);$$

t stands for time, in s; $\eta(x,y,t)$ is the free-surface elevation, in m; $h(x,y)$ is the bathymetric depth, in m; $u(x,y,z,t)$ presents the horizontal velocity, in $m \cdot s^{-1}$; $\Psi(\phi,\lambda)$ presents the earth-tidal potential in m; $\Sigma(x,y,z,t)$ presents the water density, in $kg \cdot m^{-3}$; $P_A(x,y,t)$ presents the atmospheric pressure at free surface, in $N \cdot m^{-2}$; f presents Coriolis factor, in $s^{-1}$; g presents the acceleration of gravity, in $m \cdot s^{-2}$; α presents the effective earth-elasticity factor; S,T presents salinity and the temperature of the water, in ° C.; ν presents the vertical eddy viscosity, in m²·s⁻¹; μ presents the horizontal eddy viscosity, in m²·s⁻¹; $F_s$, $F_h$ presents the horizontal diffusion for transport equations; Q presents the rate of absorption of solar radiation, in W·m⁻²; $C_p$ presents the specific heat of water, in J·Kg⁻¹·K⁻¹.

Beneficial effects: compared with the prior art, the method has the obvious advantages that:
(1) River management at present focus only on spawning season, ignoring the winter period, which is also essential to fish. Thus, this invention provide a gate control system to make sure that fishes in the downstream river could live through winters.
(2) The discharge from the gate was estimated by hydrodynamic model to secure the determined water depth. The water depth was determined based on the minimum tolerable water temperature of the target fish species. This method based on the habitat requirement for fish overwintering make river management more reasonable than before.

DETAILED DESCRIPTION OF THE INVENTION

Figure 1:
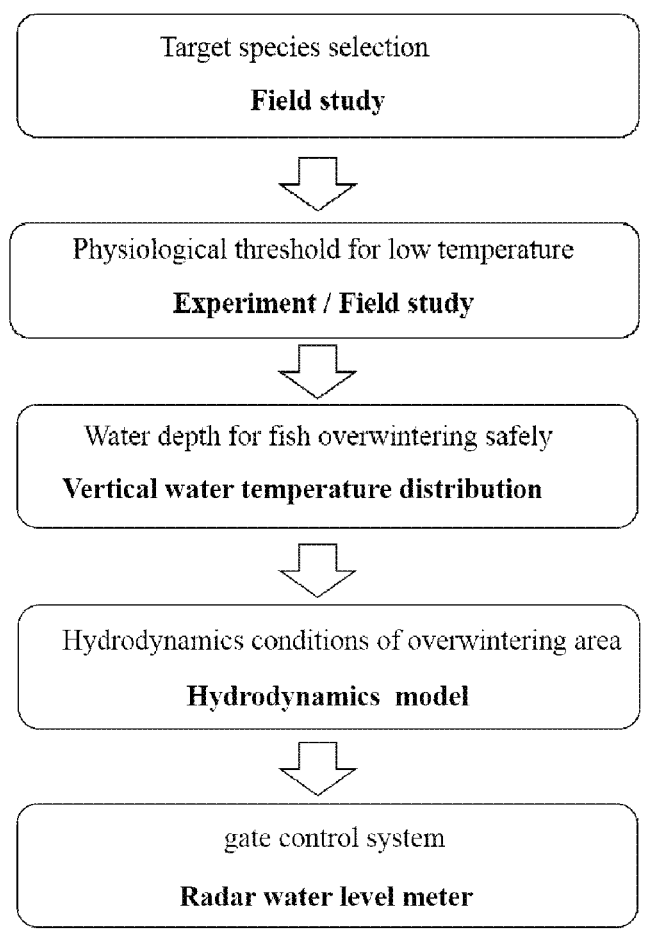
FIG. 1 is a flowchart of an embodiment of the invention.

As shown in FIG. 1, a method to control the gate based on the habitat requirement for fish overwintering in rivers comprises:
(1) Collecting fish resources and fish overwintering areas in a river, and then screening out a target species of fish by a hierarchical analysis.

The step specifically comprises the following.

(1-1) The fish resources including a number of fish populations, structural and ecological status of the fish populations, status of fishery utilization, and change pattern of the fish populations and the number so as to judge the status of the resources and the changing trend thereof; candidate fishes for calculating the ecological flow of the river are determined based on the current and historical data of the fish resources in the river;

When collecting fish specimens, in principle, all species in the research area need to be collected. Common fishes and economic fishes are mainly obtained from local fishing. For non-fishing water bodies, non-economic fishes or rare and precious fishes, special harvesting is required, and supplementary collection can also be conducted through local aquatic product markets, restaurants and recreational fishing. At the same time, historical fish resource survey data are collected, and finally fishes which appear more than a certain number of times in the catches are selected as candidates of a target fish.

(1-2) A screening principle is formulated according to the biological characteristics of fish, a judgment matrix is constructed using an hierarchical analysis method for the candidate fishes, the sorting weights of various candidate species are calculated, and the target species with representative habitat demand in the river is screened out.

Screening study is carried out on the candidate fishes in the research area from the aspects of spawning environment and feeding environment. The judgment matrix is constructed by using the hierarchical analysis method, the sorting weights of various candidate species are calculated, and finally the target fish, bream, with representative habitat demand in the research area is selected. Bream, one of the freshwater fish species, belong to the Cyprinidae, bream subfamily. Bream is typical herbivorous fish, and the seasonal changes of the food composition thereof are basically consistent with the seasonal ups and downs of aquatic plants in a lake. Bream is located in the middle layer of the trophic level. Meanwhile, a certain running water environment is required when bream lays eggs, and the habitat demand is high.

(2) Establishing a quantitative response relationship curve between the physiological adaptions of the target species and water temperature through indoor experiments and historical data collection;

The growth and reproduction of fish strongly depend on temperature, especially during the winter. The physiological threshold of low temperature for Chinese bream was determined according to the literatures that described how fish performance changes with temperature. Chinese bream is a widely distributed cyprinid in China. It spawns when water temperature is higher than 18° C., while its ideal spawning temperature ranges from 21 to 25° C. Suitable survival temperature for adults and juveniles is above 12° C. Normal metabolism is interrupted when temperature is lower than 6° C. Laboratory experiment showed that Chinese bream would be out of balance and fall into hypothermia coma when water temperature is below 6° C. Consequently, the quantitative response relationship curve of the target species bream to water temperature T can be obtained.

Figure 2:
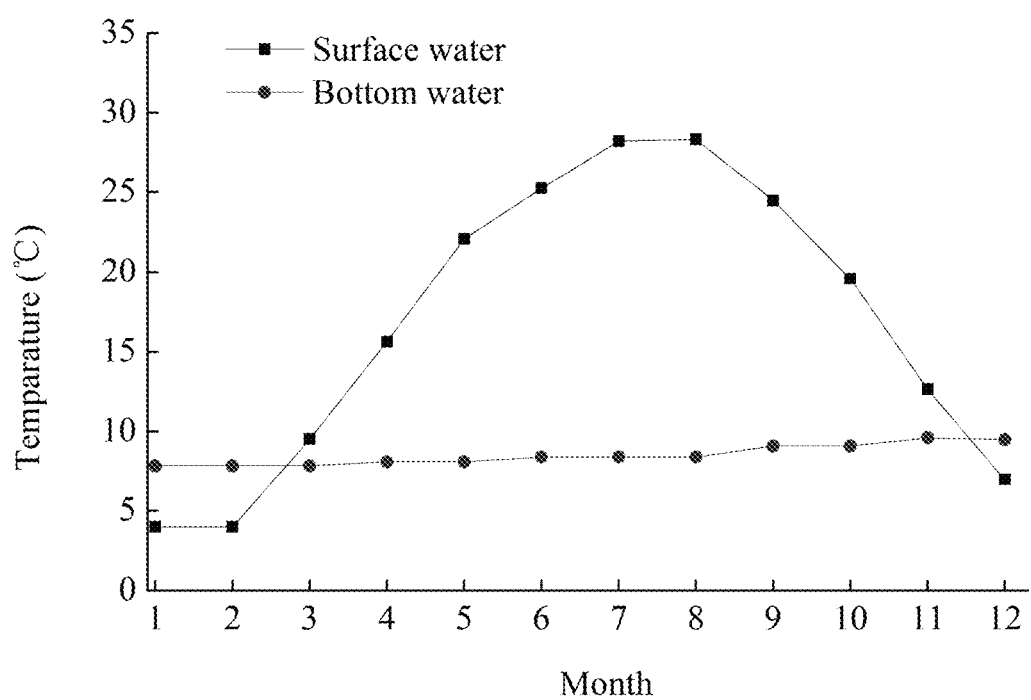
FIG. 2 is a schematic diagram of surface water temperature and bottom water temperature for each month.
Figure 3:
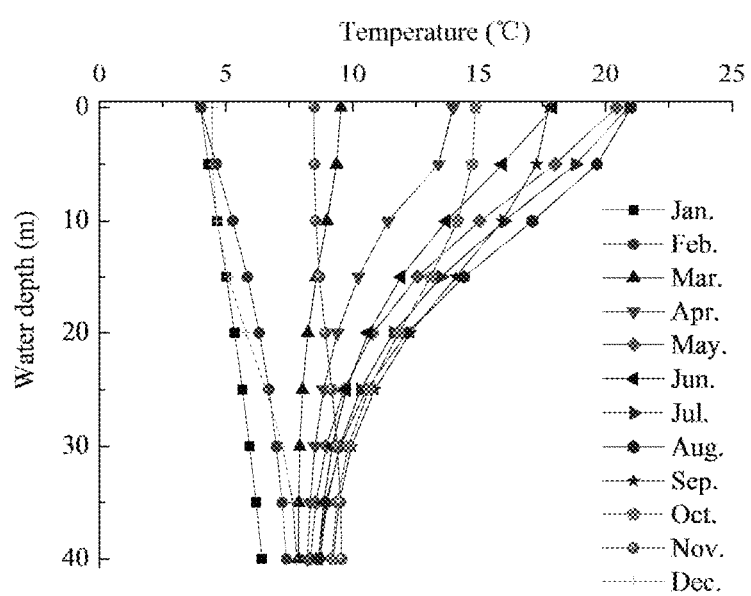
FIG. 3 is a schematic diagram of the variation of water temperature with water depth for each month.

(3) Establishing a formula of variation $f_2(H)$ between vertical water temperature T and water level H in the river; $f_2(H)$ is the vertical distribution relation formula between water temperature and water level of China Water Northeastern Investigation, Design & Research Co., Ltd., specifically as follows:

$$\begin{cases} T_H = f_2(H) = (T_0 - T_b)e^{(-H/x)n} + T_b \\ n = \dfrac{15}{m^2} + \dfrac{m^2}{35} \\ x = \dfrac{40}{m} + \dfrac{m^2}{2.37(1 + 0.1m)} \end{cases}$$

Wherein m is month, $T_b$ is the monthly average bottom water temperature, in □; $T_0$ is the monthly average surface water temperature, in □; $T_H$ is the monthly average water temperature at the depth H, in □. Based on the meteorological data from the meteorological station in the research area, the monthly average river bottom water temperature $T_b$ and surface water temperature $T_0$ of a key section of river (FIG. 2) can be obtained by checking the distribution curves of river bottom water temperature and surface water temperature $T_0$ along latitude. See FIG. 3 for the vertical distribution of the monthly average water temperature $T_H$ at water level H.

Figure 4:
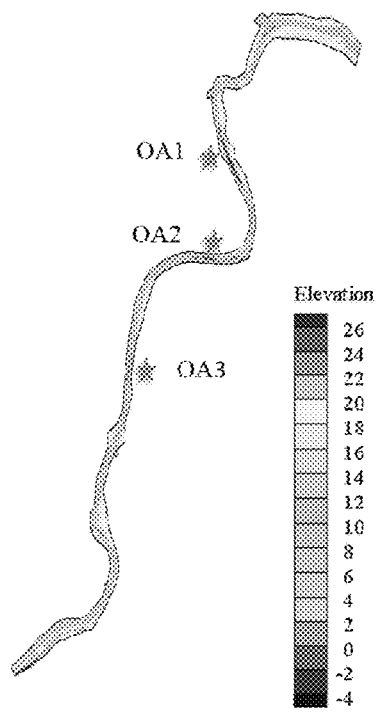
FIG. 4 is the location of the fish overwintering area in the study river.

(4) determining a minimum water temperature $T_{min}$ required for the target species to overwinter according to the quantitative response relationship curve $f_1(T)$, then obtaining an ecological water level $H_{eco}$ which can ensure the target species for overwintering safely based on $T_{min}$ according to the formula $f_2(H)$;

For example, for bream, it can be learned that the minimum water temperature $T_{min}$ required by the overwintering ground of the target fish is 6° C. according to the quantitative response relationship curve $f_1(T)$, and the minimum water level $H_{eco}$ in December required by the overwintering ground is 15 m based on $T_{min}$=6° C. according to the formula $f_2(H)$ (5) Establishing the relation $f_3(Q)$ between water depth H and discharge Q using a hydrodynamic model;

Three overwintering areas of P. pekinensis, referred as Overwintering Areas 1, 2, and 3 (OA1, OA2, and OA3), were identified. The hydrodynamic model was established in the river reach where the major overwintering grounds were located (FIG. 4). The river reach was divided into 36442 unstructured triangular grids with average side length of 50 meters in the hydrodynamic model. The relation between water depth and discharge was obtained by the hydrodynamic model.

Figure 5:
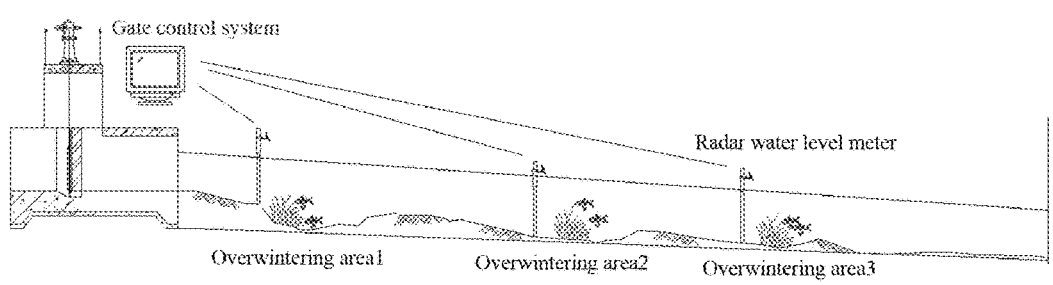
FIG. 5 is a schematic diagram of the gate control system.

(6) Setting up a gate control system including a radar water level meter in the overwintering areas and an ecological water level management system in a gate control room;

The gate control system was established (FIG. 5). There was three radar water level meter in the overwintering area1, in the overwintering area2 and in the overwintering area3. When the water level H was below the ecological water level $H_{eco}$, the gate control system will receive the signal from radar water level meter and discharge the flow according to the $f_3(Q)$.

The above disclosure is only a preferred embodiment of the present invention and cannot be used to limit the scope of the present invention. Therefore, equivalent changes made in accordance with the present invention are still within the scope of the present invention.

What is claimed is:

1. A method for controlling a dam gate based on the habitat requirement for fish overwintering in rivers, characterized in that the method comprises:
   (1) collecting fish resources and fish overwintering areas in a river, and then screening out a target species of fish by a hierarchical analysis;
   (2) establishing a quantitative response relationship curve $f_1(T)$ between the physiological adaptions of the target species and water temperature T through indoor experiments and historical data collection;
   (3) establishing a formula of variation $f_2(H)$ between vertical water temperature T and water level H in the river;
   (4) determining a minimum water temperature $T_{min}$ required for the target species to overwinter according to the quantitative response relationship curve $f_1(T)$, then obtaining an ecological water level $H_{eco}$ which can ensure the target species for overwintering safely based on $T_{min}$ according to the formula $f_2(H)$;
   (5) establishing the relation $f_3(Q)$ between water depth H and discharge Q using a hydrodynamic model;
   (6) setting up a gate control system including a radar water level meter in the overwintering areas and an ecological water level management system in a gate control room;
   (7) controlling the gate based on the $H_{eco}$ in the overwintering areas.

2. The method according to claim 1, characterized in that the step (1) specifically comprises:
   (1-1) the fish resources including a number of fish populations, structural and ecological status of the fish populations, status of fishery utilization, and change pattern of the fish populations and the number so as to judge the status of the resources and the changing trend thereof; candidate fishes for calculating the ecological flow of the river are determined based on the current and historical data of the fish resources in the river;
   (1-2) a screening principle is formulated according to the biological characteristics of fish, a judgment matrix is constructed using an hierarchical analysis method for the candidate fishes, the sorting weights of various candidate species are calculated, and the target species with representative habitat demand in the river is screened out.

3. The method according to claim 1, characterized in that the formula of variation $f_2(H)$ between the temperature T and the water level H in the step (3) is specifically as follows:

$$\begin{cases} T_H = f_2(H) = (T_0 - T_b)e^{(-H/x)^n} + T_b \\ n = \dfrac{15}{m^2} + \dfrac{m^2}{35} \\ x = \dfrac{40}{m} + \dfrac{m^2}{2.37(1+0.1m)} \end{cases}$$

wherein m is month, $T_b$ is the monthly average bottom water temperature, in □; $T_0$ is the monthly average surface water temperature, in □; $T_H$ is the monthly average water temperature at the depth H, in □.

4. The method according to claim 1, characterized in that establishing the relation $f_3(Q)$ between water depth H and discharge Q using hydrodynamic model in the step (5) is specifically as follows:
   the hydrodynamic model computed the depth-averaged flow velocity and the water-surface elevation by solving the shallow-water equations, with hydrostatic and Boussinesq approximations; in a Cartesian coordinates, the equations are:

$$\nabla \cdot u + \frac{\partial w}{\partial z} = 0$$

$$\frac{\partial \eta}{\partial t} + \nabla \cdot \int_{-h}^{\eta} u\, dz = 0$$

$$\frac{Du}{Dt} = f - g\nabla \eta + \frac{\partial}{\partial z}\left(v\frac{\partial u}{\partial z}\right);$$

$$f = -fk \times u + \alpha_g \nabla \hat{\psi} - \frac{1}{\rho_0}\nabla p_A - \frac{g}{\rho_0}\int_z^{\eta} \nabla \rho\, d\zeta + \nabla \cdot (\mu \nabla u)$$

where z is the vertical coordinate, positive upward, in m; ∇ presents $$\left(\frac{\partial}{\partial x}, \frac{\partial}{\partial y}\right);$$

t stands for time, in s; η(x,y,t) is the free-surface elevation, in m; h(x,y) is the bathymetric depth, in m; u(x,y,z,t) presents the horizontal velocity, in m·s$^{-1}$; Ψ(ϕ,λ) presents the earth-tidal potential in m; ρ(x,y,z,t) presents the water density, in kg·m$^{-3}$; $P_A$(x,y,t) presents the atmospheric pressure at free surface, in N·m$^{-2}$; f presents Coriolis factor, in s$^{-1}$; g presents the acceleration of gravity, in m·s$^{-2}$; α presents the effective earth-elasticity factor; S,T presents salinity and the temperature of the water, in ° C.; $\nu$ presents the vertical eddy viscosity, in $m^2 \cdot s^{-1}$; $\mu$ presents the horizontal eddy viscosity, in $m^2 \cdot s^{-1}$; $F_s$, $F_h$ presents the horizontal diffusion for transport equations; Q presents the rate of absorption of solar radiation, in $W \cdot m^{-2}$; $C_p$ presents the specific heat of water, in $J \cdot Kg^{-1} \cdot K^{-1}$.

\* \* \* \* \*